United States Patent [19]
Kawano et al.

[11] Patent Number: 5,713,278
[45] Date of Patent: Feb. 3, 1998

[54] PLATE-MAKING METHOD AND APPARATUS FOR STENCIL SHEET

[75] Inventors: Masakazu Kawano; Hiroyuki Ikeda; Hideo Watanabe, all of Tokyo, Japan

[73] Assignee: Riso Kagaku Corporation, Tokyo, Japan

[21] Appl. No.: 556,049

[22] Filed: Nov. 13, 1995

[30] Foreign Application Priority Data

Nov. 14, 1994 [JP] Japan ................... 6-279278

[51] Int. Cl.$^6$ ................................. B41C 1/14
[52] U.S. Cl. ....................... 101/128.4; 101/127
[58] Field of Search ................. 101/127, 128.21, 101/128.4, 129, 114, 484

[56] References Cited

U.S. PATENT DOCUMENTS

| | | | |
|---|---|---|---|
| 3,720,784 | 3/1973 | Maydan et al. | 178/6.6 R |
| 4,597,829 | 7/1986 | Sato et al. | 101/128.4 |

FOREIGN PATENT DOCUMENTS

| | | |
|---|---|---|
| 0 145 129 | 6/1985 | European Pat. Off. . |
| 0 181 981 | 5/1986 | European Pat. Off. . |
| 0 500 333 | 8/1992 | European Pat. Off. . |

*Primary Examiner*—Ren Yan
*Attorney, Agent, or Firm*—Kanesaka & Takeuchi

[57] ABSTRACT

A stencil sheet having a solvent-soluble resin layer is made by a plate-making apparatus, which is formed of a holding and moving device to hold and move the stencil sheet, a solvent supply device for supplying a solvent to the stencil sheet, and a control device. The solvent supply device is disposed at a predetermined distance away from the stencil sheet held by the holding and moving device and is moved with respect to the stencil sheet at least one of a horizontal scanning direction and a vertical scanning direction intersecting with each other. The control device obtains image signals of an image to be produced on the stencil sheet and controls the solvent supply device so that an amount of the solvent to be fed to the stencil sheet by the solvent supply device is changed based on the image signals to thereby perforate holes in the stencil sheet. The sizes of the holes perforated by the solvent is changed by the amount thereof to alter gradation of the image.

6 Claims, 6 Drawing Sheets

PLATE-MAKING METHOD AND APPARATUS FOR STENCIL SHEET

BACKGROUND OF THE INVENTION

The present invention relates to a plate-making apparatus for a stencil sheet. More particularly, the invention is concerned with an apparatus for imparting gradation to the result of printing by changing the diameter of perforations formed in a stencil sheet at the time of plate-making in a stencil type plate-making/printing apparatus or the like.

A conventional, commonly-used, stencil type plate-making/printing apparatus is provided as plate-making means with a thermal head or the like with a plurality of heating elements arranged thereon. As a stencil sheet for plate-making there is used a laminate of a substrate and a resin film bonded thereto with an adhesive. The heating elements of the thermal head melt the resin film of the stencil sheet by virtue of heat energy to make perforation, whereby there is effected a plate-making operation.

Generally, since one line of heating elements in the thermal head each generates an equal and constant heat energy, perforations formed by the heat generated from the heating elements are approximately the same in diameter. Therefore, in plate-making for a stencil sheet using an original image, it is required to read the original image and convert the image data obtained into a binary image. In this case, as a gradation expressing method, for example for a stepwise darkening portion, there usually is adopted a method wherein the density of perforations constant in diameter is increased stepwise on the stencil sheet.

As disclosed in Japanese Patent Laid Open No. 50575/93 there also has been proposed a method wherein, while a thermal head moves relatively by a distance corresponding to one perforation picture element with respect to a stencil sheet, the drive for each heating element is controlled in accordance with the density of the picture element to change the hole length in the vertical scanning direction within one perforation picture element.

In the conventional, commonly-used plate-making method and apparatus for a stencil sheet, plate-making is performed using a binary expression whether perforation is present or not in the stencil sheet, so there has been a problem that the expression of gradation is poor particularly in a photographic image or the like.

SUMMARY OF THE INVENTION

It is an object of the present invention to provide a plate-making apparatus for a stencil sheet superior in the expression of gradation.

According to a first aspect of a plate-making method for a stencil sheet, a plate-making means and the stencil sheet are relatively moved in at least one of perpendicularly intersecting vertical scanning direction and horizontal scanning direction to perforate the stencil sheet, the method comprises changing the diameter of the perforations at least in the horizontal scanning direction so that the perforations are formed in the stencil sheet.

A plate-making method for a stencil sheet in a second aspect is that, in the method of the first aspect, a solvent is fed to the stencil sheet which has a solvent-soluble resin layer by the use of a solvent supply means to melt the resin layer in the portion supplied with the solvent.

A plate-making method for a stencil sheet in a third aspect that, in the method of the second aspect, the perforations formed in the stencil sheet are changed in diameter by controlling the amount of the solvent which is fed at a time to the stencil sheet from the solvent supply means.

A plate-making method for a stencil sheet in the fourth aspect is that, in the method of the second aspect, the perforations formed in the stencil sheet are changed in diameter by controlling the number of times of supply of the solvent while keeping constant the amount of the solvent fed at a time from the solvent supply means.

A plate-making apparatus for a stencil sheet in a fifth aspect is formed by comprising a solvent supply means and a control means for adjusting the amount of a solvent to be fed to the stencil sheet, the solvent supply means moving relatively at least in one of perpendicularly intersecting vertical direction and horizontal direction with respect to the stencil sheet which has a solvent-soluble resin layer and supplying the stencil sheet with the solvent to melt the resin layer in the portion supplied with the solvent, thereby affecting perforation and plate-making.

A plate-making apparatus for a stencil sheet in a sixth aspect is that, in the apparatus of the fifth aspect, the perforations formed in the stencil sheet are changed in diameter by controlling the amount of the solvent fed at a time from the solvent supply means.

A plate-making apparatus for a stencil sheet in a seventh aspect is that, in the apparatus of the fifth aspect, the perforations formed in the stencil sheet are changed in diameter by controlling the number of times of supply of the solvent while keeping constant the amount of the solvent fed at a time from the solvent supply means.

The gradation expression of a printed matter is improved by changing the diameter at least in the horizontal scanning direction of perforations formed in a stencil paper, in accordance with gradation information. The stencil sheet obtained by such a plate-making method can afford a printed matter superior in the expression of gradation.

DETAILED DESCRIPTION OF THE PREFERRED EMBODIMENTS

In a plate-making apparatus for a stencil sheet embodying the present invention, there are used a stencil sheet having a solvent-soluble resin layer and a plate-making/printing apparatus provided with a solvent supply means for the supply of a solvent to the stencil sheet to melt the solvent-soluble resin layer. The stencil sheet is loaded onto the outer peripheral surface of a plate drum of the plate-making/printing apparatus and the solvent is discharged selectively in a contactless manner to the stencil sheet by the solvent supply means to perforate the stencil sheet. Alternatively, the perforation of the stencil sheet is performed not after the loading of the sheet onto the outer peripheral surface of the plate drum in the plate-making/printing apparatus but before the loading onto the plate drum, and then the stencil sheet thus perforated is loaded onto the plate drum. In the embodiment being considered, the diameter of perforations formed is controlled stepwise by changing the amount of the solvent fed by the solvent supply means during perforation of one picture element in the above plate-making process to thereby improve the expression of gradation of a printed matter obtained by using this printing plate.

Explanation will be made below first about the stencil sheet having a solvent-soluble resin layer, the solvent for melting the solvent-soluble resin layer and the solvent supply means, then about the plate-making/printing apparatus provided with the solvent supply means.

Figure 6:
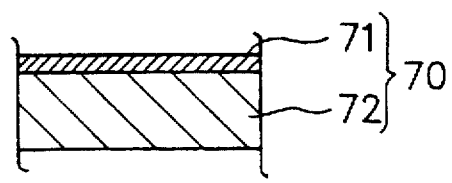
FIG. 6 is a sectional view of a stencil sheet used in the embodiments of the present invention.

FIG. 6 is a sectional view of a stencil sheet 70 used in the embodiment of the present invention. The stencil sheet 70 comprises a porous substrate 72 and a solvent-soluble resin layer 71 formed on one side of the substrate 72.

For example, the stencil sheet 70 of the above structure can be produced by any of the following methods (1) to (4).

(1) A method wherein a solvent-soluble resin film as the solvent-soluble resin layer and the porous substrate are laminated to each other by adhesives.

(2) A method wherein a solvent-soluble resin film as the solvent-soluble resin layer is fusion-bonded to the porous substrate.

(3) A method wherein a solution of a resin dissolved or dispersed in a solvent is applied onto the porous substrate and dried to form a solvent-soluble resin layer.

(4) A method wherein a solution of a resin dissolved or dispersed in a solvent is applied onto a releasable substrate and dried to form a solvent-soluble resin layer, then the releasable substrate having such solvent-soluble resin layer and the porous substrate are laminated to each other, and thereafter the releasable substrate is removed.

As examples of the porous substrate 72 used in this embodiment there are mentioned tissue paper, non-woven fabric and screen plain gauze produced by using, for example, natural fibers such as Manila hemp, pulp, paper birch, paper mulberry and Japanese hand-made paper, synthetic fibers such as polyester, nylon, vinylon and acetate, non-woven cloth, metallic fibers, or glass fibers, each alone or in combination.

The weight of the porous substrate is in the range of preferably 1 to 20 g/m$^2$, more preferably 5 to 15 g/m$^2$. If it is less than 1 g/m$^2$, the strength of the stencil paper will be deteriorated, and if it exceeds 20 g/m$^2$, the permeability of ink through the porous substrate in printing may be deteriorated. As to the thickness of the porous substrate, it is preferably in the range of 5 to 100 μm, more preferably 10 to 50 μm. If it is less than 5 μm, the stencil sheet will become less strong, and a porous substrate thickness exceeding 100 μm may result in deteriorated permeability of ink in printing.

The solvent-soluble resin layer 71 used in the embodiment contains as a principal component a thermoplastic or thermosetting resin capable of being dissolved in a solvent such as water or an organic solvent. As examples of resin components capable of being dissolved in organic solvents there are mentioned polyethylenes, polypropylenes, isobutylene, polystyrenes, polyvinyl chloride, polyvinylidene chloride, polyvinyl fluoride, polyvinyl acetate, acrylic resins, polyacrylonitriles, polyamides, polyimides, petroleum resins, phenolic resins, amino resins, epoxy resins, polyesters, polycarbonates, polyurethanes, polysulfones, silicone reins, alkyd resins, and melamine resins. These resin components may be used each alone, or as mixtures, or as copolymers.

As the water-soluble resin component there may be used a resin capable of being dissolved in water or an organic solvent miscible with water. Examples are polyvinyl alcohols, methyl cellulose, carboxymethyl cellulose, hydroxyethyl cellulose, polyvinyl pyrrolidones, polyethylene-polyvinyl alcohol copolymer, polyethylene oxides, polyvinyl ethers, polyvinyl acetals, polyacrylamides, starch, dextrin, alginic acid, ascorbic acid, and water-soluble urethanes. It is optional whether these resins are to be used each alone, or as mixtures, or as copolymers.

The solvent-soluble resin layer 71 may further contain dye, pigment, filler and curing agent in addition to the above resin components.

The thickness of the solvent-soluble resin layer is in the range of preferably 0.1 to 100 μm, more preferably 0.5 to 50 μm. If it is less than 0.1 μm, the strength of the resin layer will become insufficient, and a resin layer thickness exceeding 100 μm will require a large amount of a solvent or water for dissolving the resin layer and sometimes insufficient dissolution results.

Reference will now be made to the solvent for dissolving the solvent-soluble resin layer 71 of the stencil sheet 70. As examples of the solvent for dissolving the resin layer 71 are mentioned aliphatic hydrocarbons, aromatic hydrocarbons, alcohols, ketones, esters, ethers, aldehydes, carboxylic acids, amines, low-molecular hetercyclic compounds, and oxides, such as, for example, hexane, heptane, octane, benzene, toluene, xylene, methyl alcohol, ethyl alcohol, isopropyl alcohol, n-propyl alcohol, butyl alcohol, ethylene glycol, diethylene glycol, propylene glycol, glycerin, acetone, methyl ethyl ketone, ethyl acetate, propyl acetate, ethyl ether, tetrahydrofuran, 1,4-dioxane, formic acid, acetic acid, propionic acid, formaldehyde, acetaldehyde, methylamine, ethylenediamine, dimethylformamide, pyridine, and ethylene oxide. These solvents, which may be used each alone or in combination, may contain a coloring material such as dye or pigment, and if necessary, may further contain filler, binder, curing agent, antiseptic, wetting agent, surface active agent, Ph modifier, etc.

The solvent exemplified above is discharged in the form of droplets by the solvent supply means. As the solvent supply means there is used one comprising a nozzle, slit, syringe, porous member, or porous film, having 10 to 2,000 (10 to 2,000 dpi) holes per inch and connected to a piezoelectric element, heating element, electric field element, liquid feed pump, etc., whereby the solvent can be discharged intermittently or continuously in accordance with a character image signal. The amount of the solvent to be discharged at a time can be adjusted as desired.

Figure 7:
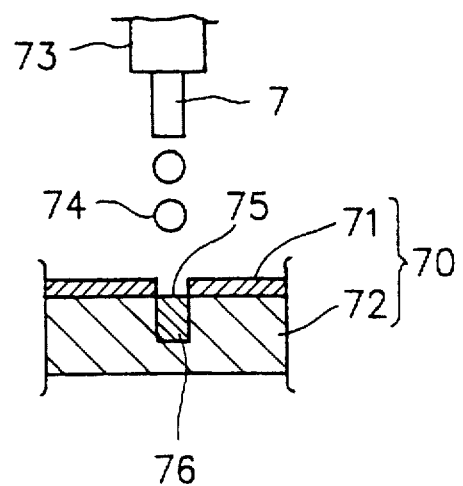
FIG. 7 is a sectional view explaining of a construction of the stencil sheet and that of a solvent supply means both used in the embodiments of the invention as well as a plate-making operation using them.

FIG. 7 schematically illustrates a plate-making operation for the stencil sheet 70 in this embodiment. The solvent supply means used in this embodiment and indicated at 73 has a nozzle 7 through which the solvent is discharged by a piezoelectric element. The solvent, indicated at 74, which has Been discharged from the solvent supply means 73 selectively in a contactless state in accordance with an image signal is fed onto the solvent-soluble resin layer 71 of the stencil paper 70. The solvent thus fed melts and perforates the solvent-soluble resin layer 71, and the resulting solution, indicated at 76, permeates and diffuses into the porous substrate 72, whereby the portion of the solvent-soluble resin layer 71 which has come into contact with the solvent 74 is perforated as indicated at 75. In this way the plate-making operation for the stencil sheet 70 is effected.

Figure 5:
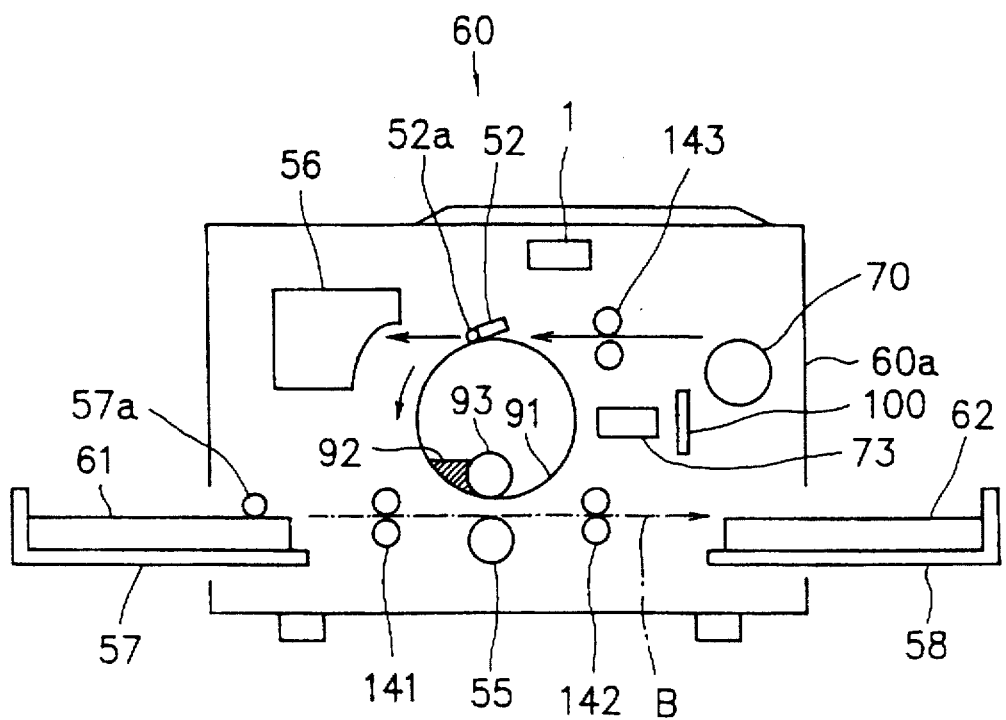
FIG. 5 is a diagram showing a construction of a plate-making/printing apparatus used in the embodiments of the present invention.

Description is now directed to a stencil type plate-making/printing apparatus 60 used in the embodiment with reference to FIG. 5. The apparatus 60 possesses both a plate-making function of dissolving the solvent-soluble resin layer 71 of the stencil sheet 70 with a solvent to effect plate-making and a function of performing a stencil printing using the stencil sheet thus perforated.

The plate-making/printing apparatus 60 has a cylindrical plate drum 91 as a stencil printing means. The plate drum 91 is rotatable about its own axis and is driven rotatively in the counterclockwise direction in FIG. 5 by means of an electric motor (not shown) which serves as a drive means. A part of the peripheral wall of the plate drum 91 is an ink penetrating area, and in the interior of the plate drum 91 is provided an ink supply means for the supply of ink 92 onto the inner surface of the peripheral wall of the plate drum 91. The ink 92 which has been fed onto the inner surface of the plate drum peripheral wall is extruded from the ink penetrating area of the peripheral wall by means of a squeegee roller 93 which is provided within the plate drum 91. The ink 92 thus extruded is further extruded through the perforated image of the stencil sheet 70 wound round the plate drum 91 and adheres to a printing paper 61 which has been fed. As the ink 92 there may be used any of those employed in the conventional stencil printing such as, for example, oily ink, aqueous ink, water-in-oil (W/O) type emulsion ink, and oil-in-water (O/W) type emulsion ink.

Outside the peripheral wall of the plate drum 91 is disposed a clamp plate 52 serving as a stencil sheet holding means. At a portion other than the ink penetrating area of the peripheral wall of the plate drum 91 is disposed a shaft 52a in parallel with a shaft of the plate drum. The clamp plate 52 is pivotable about the shaft 52a. When the clamp plate 52 arrives at the top position of the plate drum 91, it holds the front end of the stencil sheet fed to the plate drum in a sandwiching fashion between it and the outer peripheral side of the plate drum.

As shown in FIG. 5, the stencil sheet 70 rolled in a cylindrical form is disposed in an upper position on the right-hand side of the plate drum 91. The stencil sheet 70 is conveyed toward the top portion of the plate drum 91 by means of conveying rollers 143.

Then, the clamp plate 52 holds the front end of the stencil sheet 70 thus fed to the plate drum 91. In this state the plate drum 91 rotates in the counterclockwise direction in FIG. 5 and the conveying rollers 143 continue to deliver the stencil sheet 70 at an appropriate conveying speed, whereby the stencil sheet 70 is wound round the outer peripheral surface of the plate drum while being given a predetermined tension.

Referring to FIG. 5, a stencil sheet discharge section 56 for discarding the stencil sheet 70 is disposed in an upper position on the left-hand side of the plate drum 91. The stencil sheet discharge section 56 has a function of stripping off the stencil sheet 70 after use from the plate drum 91, then introducing it into a receptacle box and compressing it.

In a lower position on the left-hand side of the plate drum 91 is disposed a paper feed tray 57 for supply of the printing paper 61. Plural sheets of the printing paper 61 stacked on the paper feed tray 57 is fed out successively from above toward the plate drum 91 by means of a pickup roller 57a.

Further, as shown in FIG. 5, a press roller 55 is disposed below and at a predetermined spacing from the plate drum 91. The press roller 55 used in the embodiment is movable vertically and moves vertically in synchronism with the rotation of the plate drum 91 and the conveyance of the printing paper 61 by conveying rollers 141. More specifically, as the printing paper 61 is fed between the plate drum 91 and the press roller 55 in synchronism with the rotation of the plate drum, the press roller 55 goes up and holds the printing paper 61 between the press roller and the plate drum 91 and conveys the printing paper rightwards in the figure, with stencil printing being applied to the printing paper.

Referring to FIG. 5, in a lower position on the right-hand side of the plate drum 91 are disposed conveying rollers 142 for conveying the printing paper 62 after printing rightwards in the same figure and a paper discharge tray 58 for receiving plural sheets of the printing paper 62 conveyed by the conveying rollers 142 successively in a stacked fashion.

Further, a reading section 1 having an original reading means such as an image sensor for example is disposed substantially above the plate drum 91. The reading section 1 reads the image of an original and outputs the read image information as an electric signal. The word "image" as referred to herein should be interpreted in the broadest sense including not only pictures, photographs and patterns but also characters and the like and it covers all objects capable of being recognized visually irrespective of color.

As shown in FIG. 5, on the right-hand side of the plate drum 91 is disposed the solvent supply means 73. The solvent supply means 73 supplies a solvent capable of dissolving the solvent-soluble resin layer of the stencil sheet 70 selectively in a contactless manner to the stencil sheet 70 loaded onto the plate drum 91 to perforate the stencil sheet.

Further, a control means 100 is disposed on the right-hand side of the solvent supply means 73, as shown in FIG. 5. The control means 100 controls the solvent supply means 73 in accordance with the image signal outputted from the reading section 1 and in synchronism with the rotation of the plate drum 91. The solvent supply means 73 thus controlled by the control means discharges the solvent 74 selectively to the solvent-soluble resin layer 71 of the stencil sheet 70 loaded on the plate drum 91 being rotated to form image perforations corresponding to the image of the original in the stencil sheet 70, thereby effecting plate-making.

The control means 100 used in the embodiment may possess a function of controlling other operations than the plate-making operation for the stencil sheet 70 such as, for example, a stencil sheet winding operation around the plate drum 91, a printing operation after the plate-making, and a stencil sheet discarding operation after printing.

The control means 100 used in this embodiment can drive the solvent supply means 73 in accordance with the image signal provided from the reading section 1, but the solvent supply means 73 can also be driven using an image signal provided from the exterior of the plate-making/printing apparatus 60. For example, there may be adopted a construction wherein the original is read by an image processing unit disposed outside the plate-making/printing apparatus and the image information obtained is fed to the control means 100 of the plate-making/printing apparatus 60, allowing perforation to take place.

The components of the plate-making/printing apparatus 60 explained above are mounted to a body (not shown) and almost all of them are covered with a housing 60a. The paper feed tray 57 and the paper discharge tray 58 can be easily mounted and removed with respect to the housing 60a manually by the operator. Therefore, a suitable size of the printing paper 61 can be selected as necessary.

The following description is now provided about features of the control for the solvent supply means 73 which is conducted using the control means 100. According to a first control method, the voltage to be applied to the piezoelectric element of the solvent supply means 73 is adjusted to vary the amount of solvent discharged from the nozzle 7, thereby adjusting the diameter of perforations formed in the stencil paper.

The solvent supply means 73 used in this method has a plurality of nozzles 7 arranged in the vertical scanning direction in which the stencil sheet moves.

Figure 1:
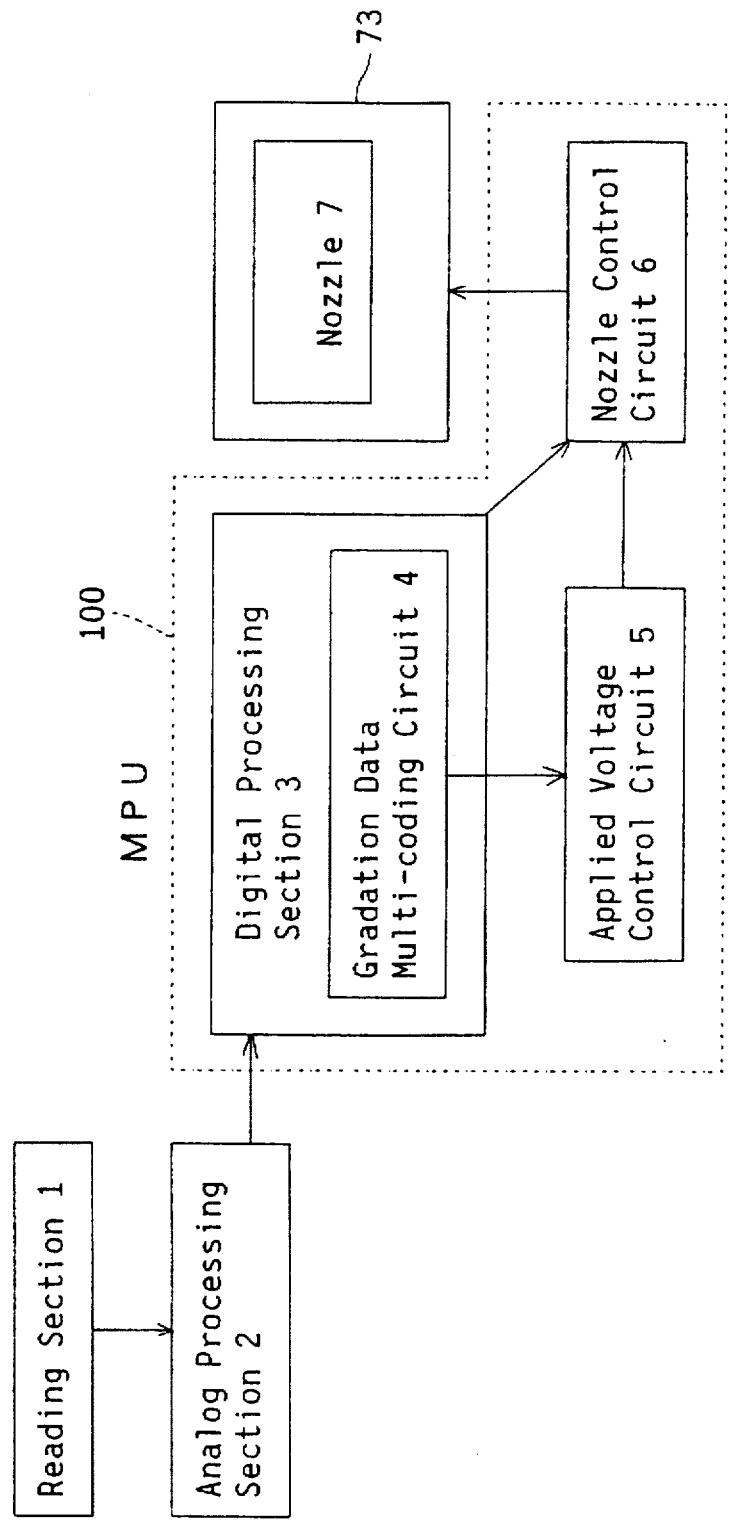
FIG. 1 is a block diagram showing a construction of a control system according to the first embodiment of the present invention.

FIG. 1 is a block diagram for practicing the above voltage control method.

In the same figure, first the reading section 1 reads image data, which data is then converted from analog to digital in an analog processing section 2. The image data is then fed to the control section 100, in which a digital processing section 3 produces image data in the stencil printer on the basis of the image data. At the same time, a gradation data multi-coding circuit 4 in the digital processing section 3 produces gradation data of the image.

The gradation data provided from the gradation data multi-coding circuit 4 is fed to an applied voltage control circuit 5, which in turn controls a nozzle control circuit 6 so that a voltage proportional to the gradation of the image is applied to the solvent supply means 73. An enable signal based on the image data is fed to the nozzle control circuit 6 from the digital processing section 3.

When the voltage proportional to the image gradation is fed to the solvent supply means 73, the solvent is discharged from the nozzle 7 of the solvent supply means 73 in an amount proportional to the gradation of the image concerned. By applying the voltage proportional to the gradation data to the piezoelectric element of the solvent supply means 73 to control the amount of solvent to be discharged, it is made possible to change the perforation diameter for each picture element according to gradation and hence it is possible to afford plural gradations.

Figure 2:
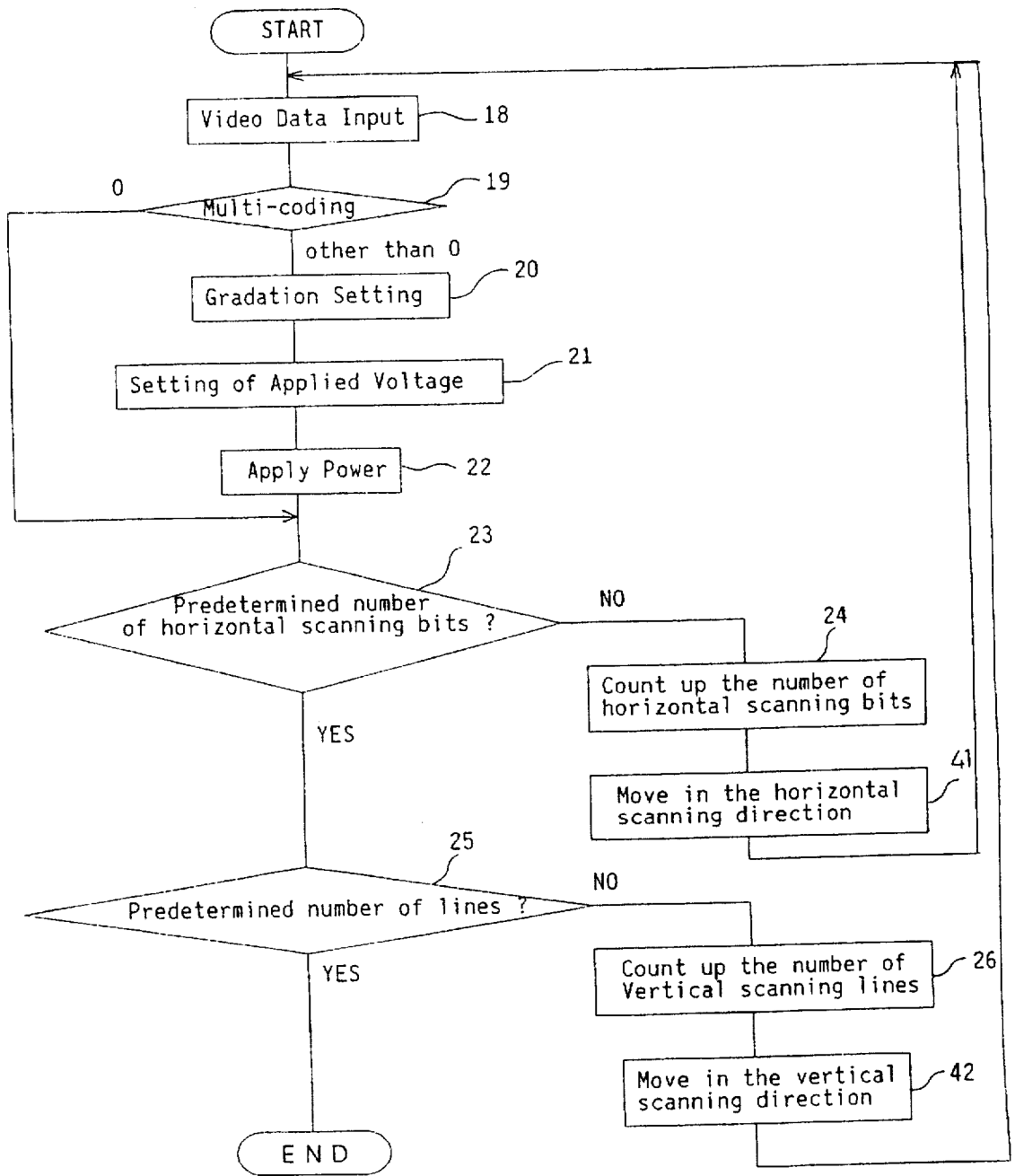
FIG. 2 is a flowchart showing a control procedure in the construction of the first embodiment.

FIG. 2 is a flowchart showing a control procedure in the above voltage control method. In step 18, image data is inputted. Then, in step 19, it is judged whether the gradation of the image data which has been subjected to multi-coding by digital processing is 0 or not. If the result of the judgment is other than 0, its gradation setting is performed in step 20, then a voltage proportional to the gradation is set in step 21, and the voltage thus set is applied to the piezoelectric element of the solvent supply means in step 22.

When the judgment result in step 19 is 0, or when the application of power in step 22 is over, it is judged in step 23 whether a predetermined number of horizontal scanning bit is satisfied or not in step 23. If the answer is negative, the number of horizontal scanning bits is counted in step 24, then as in step 41 the solvent supply means is moved in the horizontal scanning direction by a distance corresponding to the counted bits and a control is made for the gradation of the next bit.

If the predetermined number of horizontal scanning bits is satisfied, it is assumed that the scanning of vertical scanning line is over, and judgment is made in step 25 as to whether a predetermined number of vertical scanning lines is satisfied or not. If the answer is negative, the number of vertical scanning lines is counted in step 26, and the solvent supply means is relatively moved in the vertical scanning direction by a distance corresponding to the result of the counting as shown in step 42. Then, the flow returns to step 18 and processing is started from the image data at the head of the next line. On the other hand, if the answer is positive in step 25, the processing routine is ended.

It is not always required that the above process be carried out for each picture element. Such process may be performed for several horizontal scanning bits or several vertical scanning lines at a time.

Reference will now be made to the second control method. The second control method is a number-of-times-of-solvent supply controlling method wherein the supply of solvent is repeated for a picture element portion to be gradated in accordance with gradation information produced from image density data while keeping constant the amount of solvent discharged by the solvent supply means. The perforations formed in the stencil sheet are adjusted in diameter by changing the number of times of solvent discharged from the nozzle 7.

Discharging the solvent several times for one picture element may be done by a method wherein the solvent supply means is moved repeatedly several times for one printing line to supply the solvent repeated to a picture element to be gradated.

For example, as in the case of an ink jet printer for color printing, there may be used a solvent supply means wherein two or more nozzles are arranged in series in the horizontal scanning direction. In this case, in a single printing scan, a solvent is discharged from plural nozzles to a picture element to be gradated successively in accordance with the gradation. Since the solvent is fed to each picture element by the number of times proportional to the gradation, it is possible to change the diameter of the resulting hole and hence possible to afford plural gradations.

Figure 3:
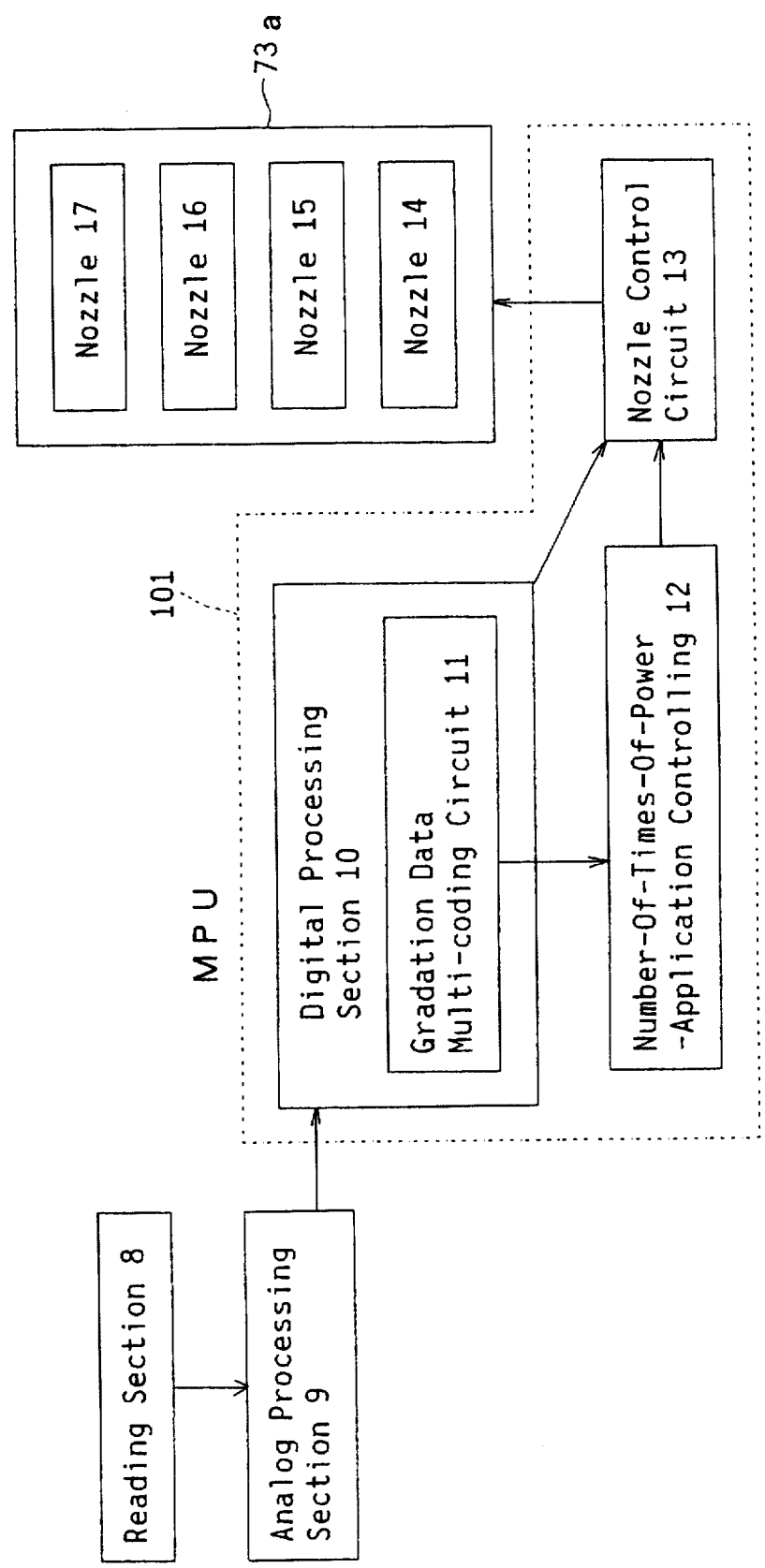
FIG. 3 is a block diagram showing a construction of a control system according to the second embodiment of the present invention.

FIG. 3 is a block diagram showing a construction to be adopted for practicing the number-of-times-of-solvent supply controlling method. In the embodiment illustrated therein there is used a solvent supply means including four nozzles arranged in series in the horizontal scanning direction. In the same figure, first a reading section 8 reads image data, which data is then converted from analog to digital in an analog processing section 9. The image data thus converted from analog to digital is then fed to a control section 101, in which a digital processing section 10 creates image data in the stencil printer on the basis of the image data. At the same time, a gradation data multi-coding circuit 11 creates gradation data of the image.

The gradation data outputted from the gradation data multi-coding circuit 11 is fed to a number-of-times-of-power application controlling circuit 12, which in turn controls a nozzle control circuit 13 so that a voltage is applied to the solvent supply means 73 by the number of times proportional to the image gradation, with an enable signal based on the image data being fed from the digital processing section to the nozzle control circuit 13.

When a predetermined voltage is applied to the piezoelectric element of the solvent supply means indicated at 73a by a number of times corresponding to the image gradation, the solvent is discharged from nozzles 14, 15, 16 and 17 of the solvent supply means 73a by a number of times corresponding to the gradation of the picture element concerned. In this way the amount of solvent to be supplied is controlled for each picture element and it is possible to change the hole diameter in accordance with gradation for each picture element, whereby it becomes possible to afford a plurality of gradations.

Figure 4:
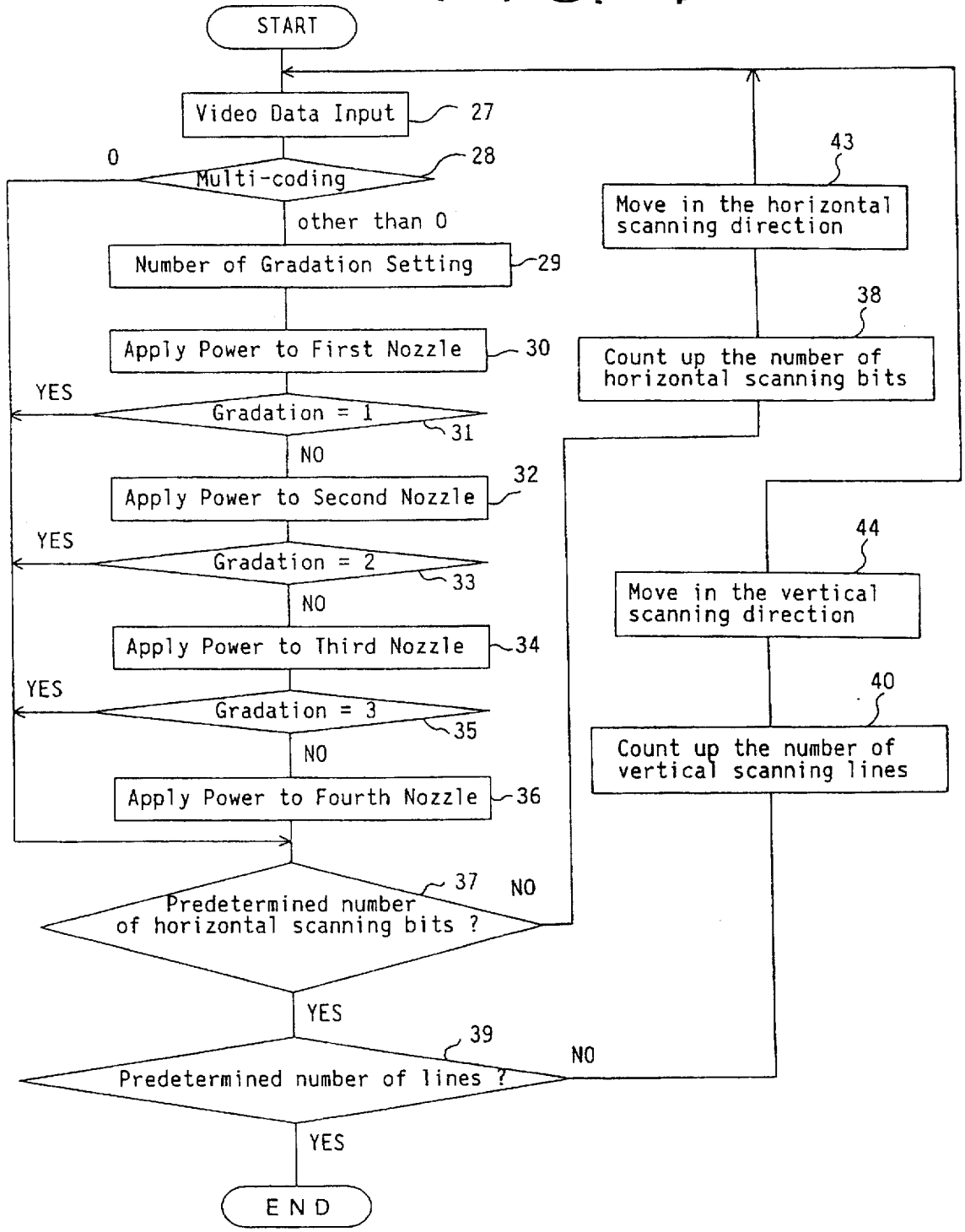
FIG. 4 is a flowchart showing a control procedure in the construction of the second embodiment.

FIG. 4 is a flowchart showing a control procedure in the number-of-times-of-solvent supply controlling method described above. Image data is inputted in step 27. Then, in step 28, judgment is made as to whether the gradation of image data which has been multi-coded by digital processing is 0 or not. If the answer is negative, its gradation setting is performed in step 29 and power is applied to the piezoelectric element of the first nozzle 14 in step 30.

Then, in step 31 it is judged whether the number of gradation is 1 or not and if the answer is negative, power is applied to the piezoelectric element of the second nozzle 15 in step 32. Next, in step 33 it is judged whether the number of gradation is 2 or not and if the answer is negative, power is applied to the piezoelectric element of the third nozzle 16 in step 34. Further, in step 35 it is judged whether the number of gradation is 3 or not and if the answer is negative, power is applied to the piezoelectric element of the fourth nozzle 17 in step 36.

When the gradation is judged to 0 in step 28, or when the result of the judgment in steps 31, 33 and 35 is YES, or when power is applied to the piezoelectric element of the fourth nozzle 17 in step 36, it is judged in step 37 whether the predetermined number of horizontal scanning bits is satisfied or not. If the answer is negative, the number of horizontal scanning bits is counted in step 38 and the solvent supply means 73a is moved in the horizontal scanning direction by a distance corresponding to the result of the counting, then the gradation control for the next bit is started.

If it is judged in step 37 that the predetermined number of horizontal scanning bits is satisfied, it is assumed that the scanning of vertical scanning line is over, and it is judged in step 39 whether the predetermined number of vertical scanning lines is satisfied or not. If the answer is negative, the number of vertical scanning lines is counted in step 40 and the solvent supply means 73 is relatively moved in the vertical scanning direction by a distance corresponding to the result of the counting as in step 44. Thereafter, processing is started from the image data of the head bit in the line next to step 27. On the other hand, if the answer is positive in step 39, the processing routine is ended.

It is not always necessary that the process described above be performed pixel by pixel. The process may be carried out for several horizontal scanning bits or several vertical scanning lines at a time.

According to the present invention, the gradation of a perforation image is controlled by changing the diameter at least in the horizontal scanning direction of perforations formed in a stencil sheet. Particularly, in the case of perforating a stencil sheet having a solvent-soluble resin layer by the use of a solvent, the perforations formed in the stencil sheet is adjusted by controlling the amount of the solvent supplied to control the gradation of the perforation image. Therefore, according to the present invention it is possible to effect plate-making superior in the expression of gradation for the stencil sheet. Particularly in the plate-making using a photographic image or the like, it is possible to attain a superior expression of gradation.

What is claimed is:

1. A plate-making apparatus for a stencil sheet having a solvent-soluble resin layer, comprising:
    holding and moving means adapted to hold and move a stencil sheet,
    solvent supply means for supplying a solvent to the stencil sheet, said solvent supply means being disposed at a predetermined distance away from the stencil sheet held by the holding and moving means and being moved relatively with respect to the stencil sheet in at least one of a horizontal scanning direction and a vertical scanning direction intersecting with each other, and
    control means electrically connected to the solvent supply means, said control means obtaining image signals of an image to be produced on the stencil sheet and controlling the solvent supply means so that an amount of the solvent to be fed to the stencil sheet by the solvent supply means is changed based on the image signals to thereby perforate holes in the stencil sheet.

2. A plate-making apparatus according to claim 1, wherein said control means includes a gradation data multi-coding circuit for producing gradation data of the image, an applied voltage control circuit connected to the gradation data multi-coding circuit, and a nozzle control circuit to apply a voltage proportional to the gradation of the image to the solvent supply means, the sizes of the holes formed in the stencil sheet being changed by the amount of the solvent fed at one time from the solvent supply means.

3. A plate-making apparatus according to claim 2, wherein said control means further includes a digital processing section for providing an enable signal based on the image date to the nozzle control circuit.

4. A plate-making apparatus according to claim 1, wherein said control means includes a gradation data multi-coding circuit for creating gradation data of the image, a number-of-times-of-power application controlling circuit electrically connected to the gradation data multi-coding circuit for receiving the gradation data, and a nozzle control circuit connected to the number-of-times-of-power application controlling circuit to apply a voltage to the solvent supply means by a number of times proportional to the image gradation, the sizes of the holes formed in the stencil sheet being changed by the number of times of the solvent supplied from the solvent supply means while the amount of the solvent fed at a time from the solvent supply means is constant.

5. A plate-making apparatus according to claim 4, wherein said control means further includes a digital processing section for providing an enable signal based on the image date to the nozzle control circuit.

6. A plate-making apparatus according to claim 1, wherein said solvent supply means includes a plurality of holes to eject the solvent therethrough, and means for ejecting the solvent through the holes provided in the respective holes so that when one of the ejecting means is actuated, the solvent is ejected from one of the holes corresponding thereto to provide the solvent onto the stencil sheet.

* * * * *